(12) United States Patent
Matama

(10) Patent No.: US 6,515,766 B1
(45) Date of Patent: Feb. 4, 2003

(54) PHOTOGRAPHIC PHOTOSENSITIVE MATERIAL AND PHOTOGRAPHIC PRINTING SYSTEM

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/559,740

(22) Filed: Apr. 28, 2000

Related U.S. Application Data

(62) Division of application No. 09/374,989, filed on Aug. 16, 1999.

(30) Foreign Application Priority Data

Aug. 20, 1998 (JP) ............................................. 10-234549

(51) Int. Cl.[7] .......................... H04N 1/409; H04N 1/58; H04N 1/60; H04N 1/04; G06K 15/02; G06K 19/00

(52) U.S. Cl. ........................ 358/1.9; 358/3.27; 358/509; 358/518; 358/527; 358/532; 235/487; 235/493

(58) Field of Search ........................ 358/1.9, 518, 527, 358/532, 487, 520, 475, 509, 3.27; 235/487, 493

(56) References Cited

U.S. PATENT DOCUMENTS

| | | | | |
|---|---|---|---|---|
| 4,812,903 A | * | 3/1989 | Wagensonner et al. | 358/520 |
| 4,999,717 A | * | 3/1991 | Nagashima | 358/474 |
| 5,703,701 A | * | 12/1997 | Yamamoto et al. | 358/487 |
| 5,748,287 A | * | 5/1998 | Takahashi et al. | 358/527 |
| 5,799,219 A | * | 8/1998 | Moghadam et al. | 358/527 |
| 5,919,730 A | | 7/1999 | Gasper et al. | |
| 6,020,115 A | | 2/2000 | Orengo et al. | |

* cited by examiner

Primary Examiner—Scott Rogers
(74) Attorney, Agent, or Firm—Birch, Stewart, Kolasch & Birch, LLP

(57) ABSTRACT

A photographic photosensitive material and a photographic printing system are provided which can prevent deterioration in image quality even in a case in which a photographic photosensitive material which does not have a color correcting function or a sharpness enhancing function is subjected to printing processing. An identification code recorded in advance on the photographic film is read. Prescan conditions are computed in accordance with the identification code, and prescanning is carried out. On the basis of a prescan image, fine scan conditions are computed, and fine scanning is carried out. Further, parameters for color correction and parameters for sharpness processing which correspond to the identification code are read. Read parameters are outputted to an automatic set-up engine, and image processing is carried out by combining designated parameters.

5 Claims, 12 Drawing Sheets

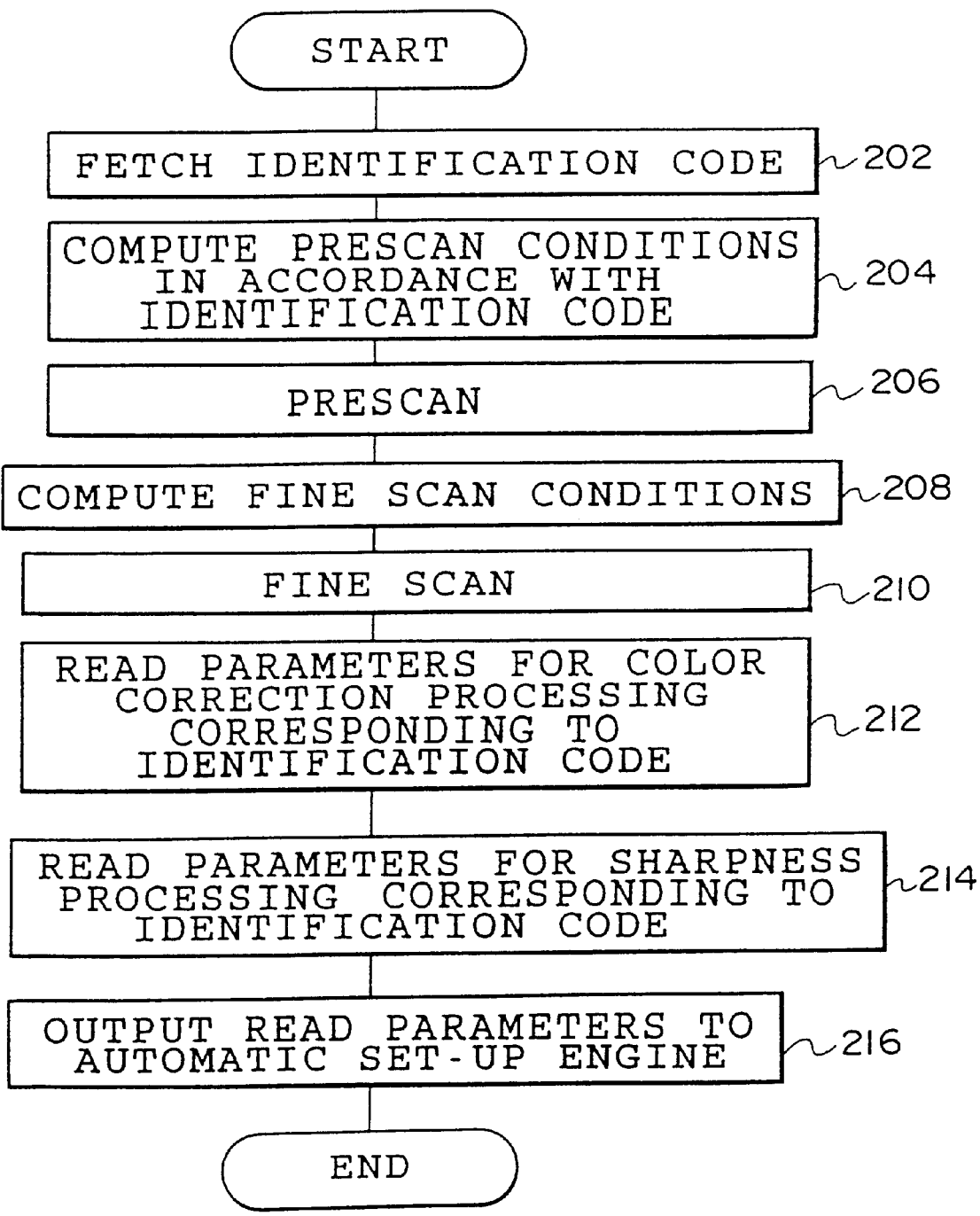

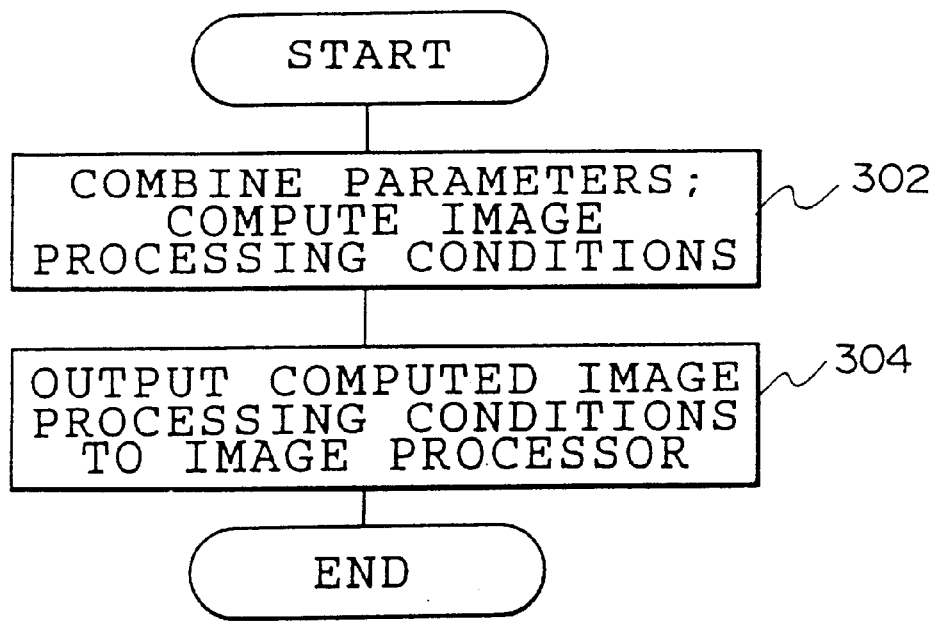
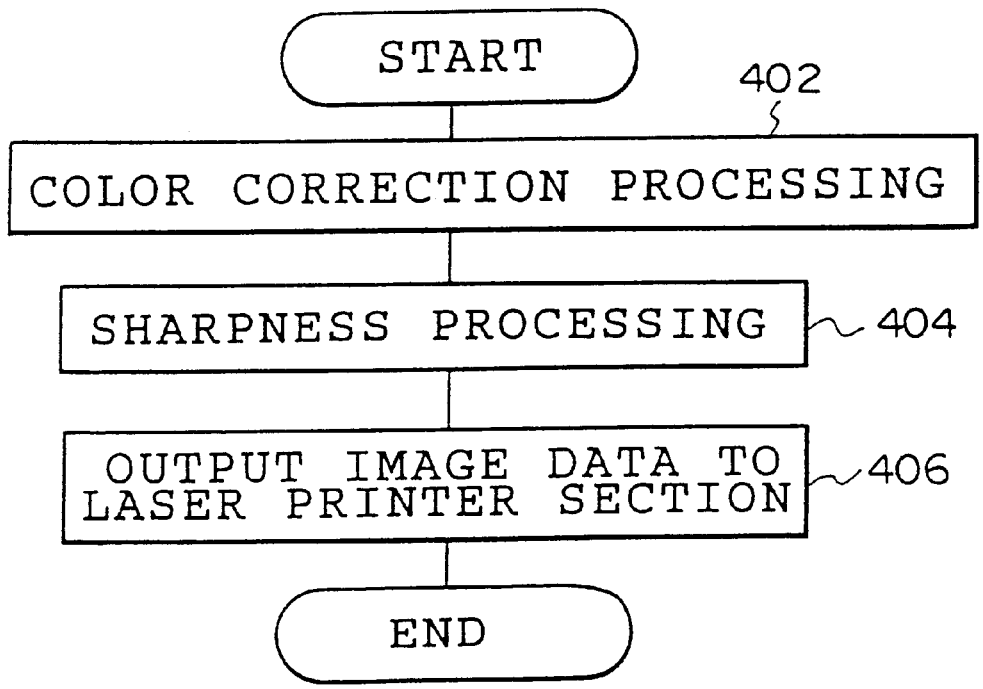

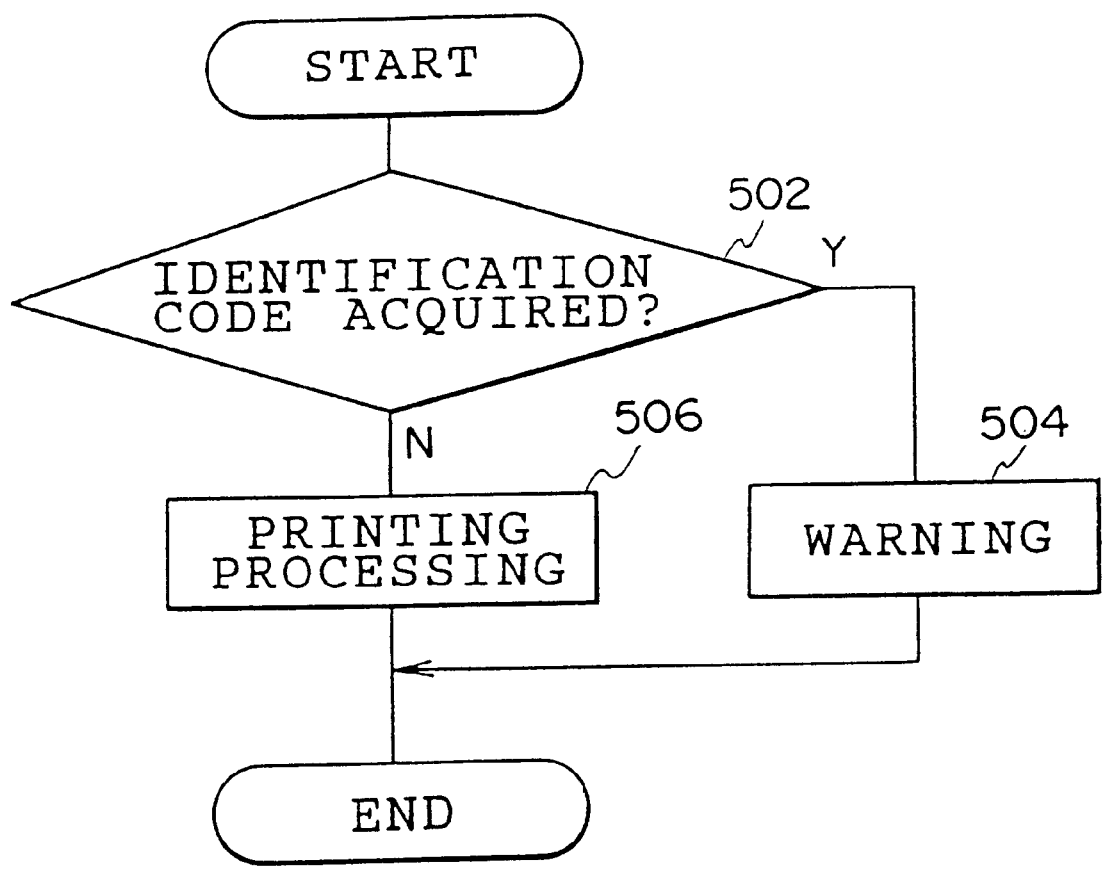

PHOTOGRAPHIC PHOTOSENSITIVE MATERIAL AND PHOTOGRAPHIC PRINTING SYSTEM

This application is a divisional of co-pending application Ser. No. 09/374,989, filed on Aug. 16, 1999, the entire contents of which are hereby incorporated by reference.

BACKGROUND OF THE INVENTION

1. Field of the Invention

The present invention relates to a photographic photosensitive material and a photographic printing system, and in particular, to a photographic photosensitive material on which an image is recorded and a photographic printing system which carries out printing processing on the basis of the image recorded on the photographic photosensitive material.

2. Description of the Related Art

A widely-used conventional photographic photosensitive material, such as a negative film used for recording color images, is structured such that a blue-sensitive emulsion layer containing a dye (coupler) which colors to yellow, a green-sensitive emulsion layer containing a dye which colors to magenta, and a red-sensitive emulsion layer containing a dye which colors to cyan, are layered on a film base.

The dye which colors to magenta and the dye which colors to cyan function to control only the green light and the red light, respectively. However, these dyes unnecessarily absorb small amounts of light of other colors as well, resulting in a deterioration in color reproducibility at the time of color printing. Thus, a coupler which is colored (what is known as a "colored coupler") is included in the above photographic photosensitive material so that, when color printing is carried out, negative images which should not have been absorbed are masked and eliminated (i.e., "masking" is carried out) and color correction is performed. In FIG. 11, the spectral density of the magenta dye is illustrated by the solid line, and the spectral density of the colored coupler is illustrated by the dashed line. As development proceeds, the curve which illustrates the spectral density characteristic of the magenta dye shifts in the direction illustrated by the solid arrow in the figure, and thus the density of the blue increases correspondingly. However, as development proceeds, the curve of the spectral density characteristic of the colored coupler shifts in the direction illustrated by the dashed arrow in the figure, and thus the density of the blue decreases correspondingly. Therefore, regardless of the extent to which the magenta dye colors, the blue density remains constant and thus does not affect color reproduction.

Because an image of a photograph is formed by a chemical reaction known as development, the products of the chemical reaction are dispersed and inhibit the development of their surroundings. This effect is the edge effect caused by a DIR coupler as will be described later. On the other hand, when the products of the chemical reaction disperse into other photosensitive layers, the interaction which suppresses development is known as the interimage effect. This development as expressed by color reversal film characteristic curves is shown in FIG. 12. In FIG. 12, the solid lines are the characteristic curves at the time red exposure is carried out, and the dashed line is the characteristic curve for only cyan at the time that white exposure is carried out. When white exposure is carried out, the gradation properties are affected due to the suppression of development caused by the interaction between the magenta and yellow layers. This effect contributes to an improvement in color saturation, and is widely used on silver halide photographic films.

Such a photographic film includes a so-called DIR coupler (development inhibitor releasing coupler) which works to improve the sharpness of the image. For example, if the original density of an image is as shown in FIG. 13A, the DIR coupler causes an edge effect at the boundary portions of the image such that the sharpness is enhanced and the density of the image becomes as shown in FIG. 13B.

In recent years, digital printing systems have come to be known in which a film image recorded on a photographic film such as that described above is read by a CCD scanner or the like so as to obtain digital image data of the image frame, and printing exposure onto a photographic printing paper is carried out on the basis of the obtained digital image data. In such a digital printing system, various types of correction are carried out on the read image data by digital image processing.

When the reading of the image is carried out by a CCD scanner, due to masking, the blue density tends to increase and the blue sensitivity tends to be insufficient. Thus, it is difficult to read the image at high speed and a high S/N ratio. If no colored coupler for color correction is included in the photographic photosensitive material so that there is no masking effect and instead color correction is carried out through image processing, the image can be scanned at a high speed and a high S/N ratio. In particular, with lens-fitted film packages, because the diaphragm and shutter speed are fixed, there is a tendency toward extreme overexposure, and thus, the aforementioned method is effective. In addition, if no DIR coupler is included in the photographic photosensitive material and sharpness enhancement is carried out by image processing, the photographic film can be manufactured less expensively.

However, the following problems arise when processing photographic films which are used exclusively for digital image processing and which do not contain any colored coupler or DIR coupler (hereinafter, such films are referred to as "digital films"). When a digital film is subjected to printing processing in a conventional analog printing system, the obtained image is of low quality because color correction and sharpness enhancement cannot be carried out in the image processing. Further, a low-quality image is obtained also when a digital film is processed in a digital printing system under conditions for processing conventional films.

SUMMARY OF THE INVENTION

In view of the aforementioned, an object of the present invention is to provide a photographic photosensitive material and a photographic printing system in which deterioration in image quality can be prevented even if a photographic photosensitive material which does not include a color correction function or a sharpness enhancement function is subjected to printing processing.

A first aspect of the present invention is a photographic photosensitive material which either has only one of or none of a color correcting function for carrying out color correction of an image which has been subjected to developing processing and a sharpness enhancing function for enhancing sharpness of the image which has been subjected to developing processing, wherein an identification code is recorded on the photographic photosensitive material, the identification code expressing that the photographic photosensitive material either has only one of or none of the color correcting function and the sharpness enhancing function.

In a second aspect of the present invention, in the photographic photosensitive material of the first aspect, the color correcting function is due to at least one of a colored coupler and an interimage effect.

In a third aspect of the present invention, in the photographic photosensitive material of the first aspect, the sharpness enhancing function is due to a DIR coupler.

A fourth aspect of the present invention, in the photographic photosensitive material of the first aspect, the identification code is recorded optically or magnetically onto the photographic photosensitive material, or is recorded onto a storage element provided at a cartridge accommodating the photographic photosensitive material.

In a fifth aspect of the present invention, in the photographic photosensitive material of the first aspect, the identification code is displayed on a surface of a cartridge accommodating the photographic photosensitive material.

A sixth aspect of the present invention is a photographic printing system for carrying out printing processing on the basis of an image recorded on a photographic photosensitive material other than the photographic photosensitive material of the first aspect, comprising: identification code reading means for reading the identification code recorded on the photographic photosensitive material of the first aspect; and notifying means for, in a case in which the identification code is read by the identification code reading means, carrying out one of notification and a processing for making printing impossible.

In accordance with the first aspect, the photographic photosensitive material has either one of or none of a color correcting function, for carrying out color correction of an image which has been subjected to developing processing, and a sharpness enhancing function, for enhancing the sharpness of the image. An identification code is recorded on the photographic photosensitive material. The identification code expresses that the photographic photosensitive material either has only one of or none of the color correcting function and the sharpness enhancing function. By reading the identification code, it can be easily determined that the photographic photosensitive material is a digital film. Further, the photographic photosensitive material is inexpensive because it either has only one of or none of the color correcting function and the sharpness enhancing function.

It is desirable that the color correcting function is at least one of a colored coupler and an interimage effect, as in the second aspect of the present invention. In this way, the color reproduction at the time of developing can be improved. Further, it is desirable that the sharpness enhancing function includes the DIR coupler, as in the third aspect. In this way, an image whose sharpness is enhanced at the time of development can be obtained.

As in the fourth aspect, the identification code may be recorded onto the photographic photosensitive material either optically or magnetically. The identification code may be recorded on a storage element provided at the cartridge accommodating the photographic photosensitive material. Further, if the entire surface of the film is coated with a transparent magnetic layer, the identification code can be recorded in the image recording region.

Alternatively, as in the fifth aspect, the identification code may be displayed (e.g., by means of a bar-code) on a surface of a cartridge accommodating the photographic photosensitive material.

The sixth aspect of the present invention is a printing system for carrying out printing processing on the basis of an image recorded on a photographic photosensitive material other than the photographic photosensitive material of the first aspect, i.e., an image recorded on an ordinary photographic photosensitive material. In this printing system, the identification code recorded on the photographic photosensitive material of the first aspect is read by the identification code reading means. Then, if the identification code is read, a judgment is made that the photographic photosensitive material on which the identification code is recorded is a photographic photosensitive material of the first aspect. In this case, a notification means gives notice that such a situation exists and/or the shutter is made unable to open and close such that printing processing cannot be carried out. Therefore, photographic photosensitive materials of the first aspect are not mistakenly processed.

A seventh aspect of the present invention is a photographic printing system able to carry out printing processing on the basis of an image recorded on the photographic photosensitive material of the first aspect, comprising: identification code reading means for reading the identification code recorded on the photographic photosensitive material of the first aspect; a light source for illuminating light onto the photographic photosensitive material; image forming means for forming an image of light which has been emitted from the light source and has passed through the photographic photosensitive material; image reading means for, on the basis of image reading conditions corresponding to the read identification code, reading the image formed by the image forming means; color correcting means for, on the basis of color correcting conditions corresponding to the read identification code, carrying out color correction on the image read by the image reading means; and sharpness enhancing means for, on the basis of sharpness processing conditions corresponding to the read identification code, carrying out sharpness enhancement on the image read by the image reading means.

In a eighth aspect of the present invention, in the photographic printing system of the sixth aspect, the image reading conditions are conditions which make at least one of (A) the amount of the light emitted from the light source and illuminated onto the photographic photosensitive material, and (B) the charge accumulating time of the image reading means, less than that of an ordinary photographic photosensitive material.

The seventh aspect of the present invention is a photographic printing system which can carry out printing processing on the basis of an image recorded on the photographic photosensitive material of the first aspect. The identification code recorded on the photographic photosensitive material of the first aspect is read by the identification code reading means. Then, the image forming means forms an image of the light which is emitted from the light source and passes through the photographic photosensitive material. In a case in which the identification code is read by the identification code reading means, the formed image is read by the image reading means under image reading conditions which correspond to the read identification code. Further, when the identification code is read by the identification code reading means, the color correcting means carries out color correction on the read image under color correction conditions corresponding to the read identification code, and the sharpness enhancing means carries out sharpness enhancement on the read image under sharpness processing conditions corresponding to the identification code.

When a photographic photosensitive material does not include a colored coupler, the base density is lower than that of an ordinary photographic photosensitive material. Therefore, when the image is read under ordinary image reading conditions by an image reading means such as a CCD or the like, the output of the CCD becomes saturated. Therefore, in the eighth aspect, the image reading conditions are conditions which lower at least one of the amount of light emitted from the light source and illuminated onto the photographic photosensitive material, and the charge accumulating time of the image reading means. In this way, the CCD output does not become saturated.

Because processing is carried out under image reading conditions, color correction conditions, and sharpness processing conditions which correspond to the identification code, the image quality does not deteriorate even when a photographic photosensitive material which does not have a color correcting function or a sharpness enhancing function is subjected to printing processing.

BRIEF DESCRIPTION OF THE DRAWINGS

FIG. 7 is a flowchart illustrating the flow of control executed at the CPU of a personal computer.

FIG. 8 is a flowchart illustrating the flow of control executed at an automatic set-up engine.

FIG. 9 is a flowchart illustrating the flow of control executed at an image processor section.

FIG. 10 is a flowchart illustrating the flow of control executed at an analog printing system.

DESCRIPTION OF THE PREFERRED EMBODIMENTS

Embodiments of the present invention will be described in detail hereinafter with reference to the accompanying drawings.

Overall Structure of System

Figure 1:
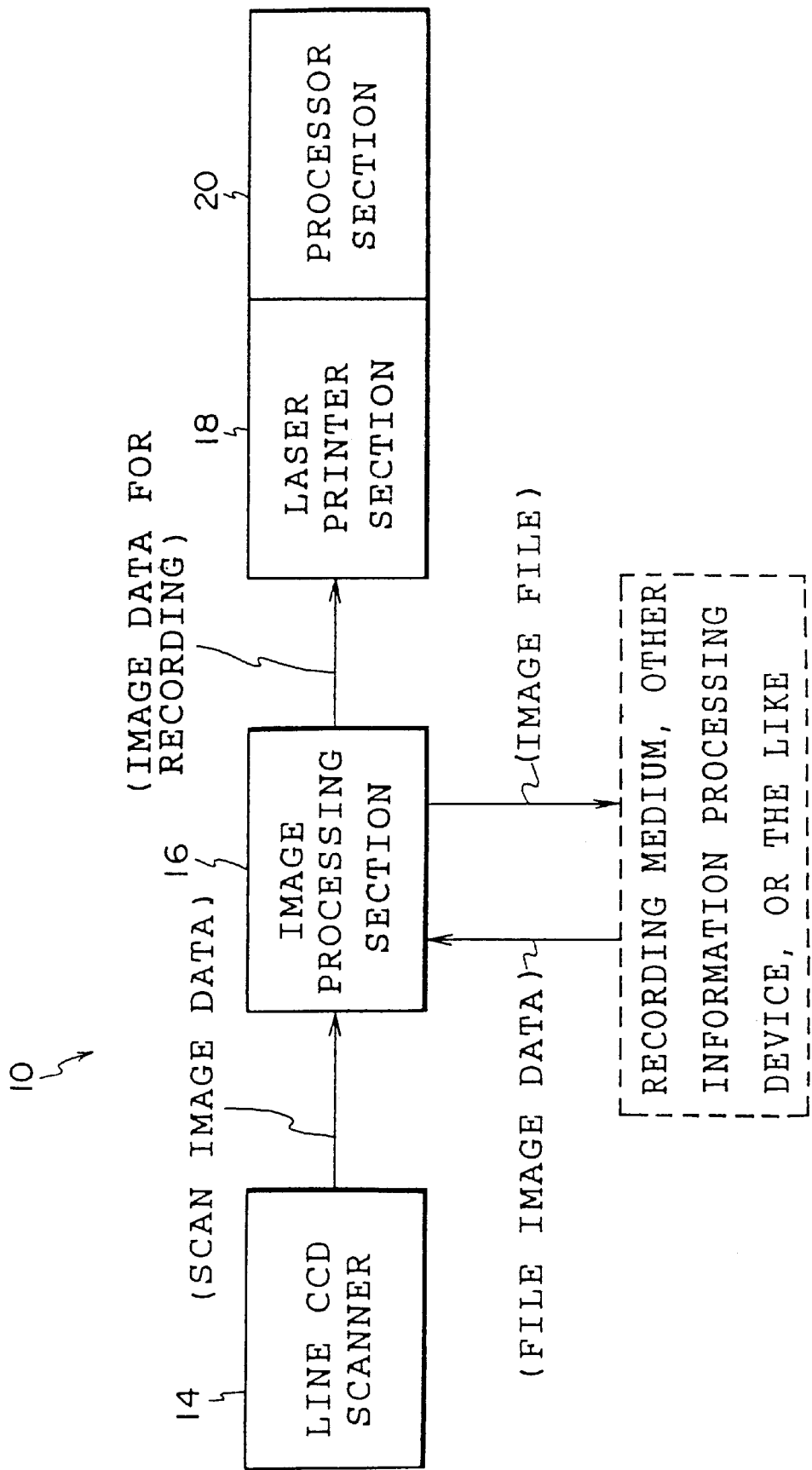
FIG. 1 is a schematic structural view of a digital lab system relating to an embodiment of the present invention.
Figure 2:
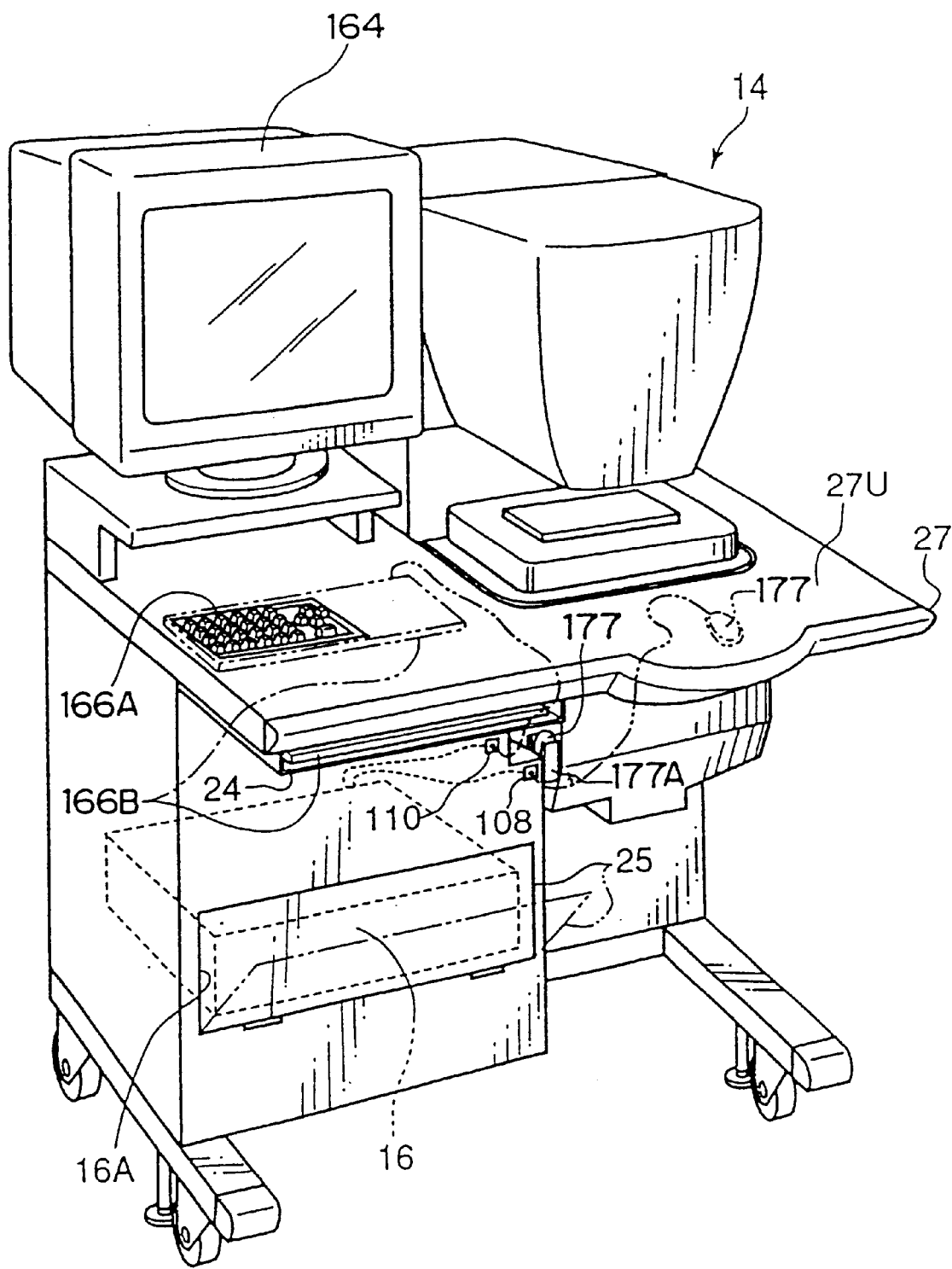
FIG. 2 is a view of the exterior of a line CCD scanner

First, the digital lab system relating to the present embodiments will be described. FIG. 1 illustrates the schematic structure of a digital lab system 10 relating to the present embodiment. As illustrated in FIG. 1, the digital lab system 10 includes a line CCD scanner 14, an image processing section 16, a laser printer section 18, and a processor section 20. The line CCD scanner 14 and the image processing section 16 are formed integrally as an input section as illustrated in FIG. 2.

The line CCD scanner 14 reads a frame image recorded on a photographic film such as a negative film, a reversal film, or the like. For example, the line CCD scanner 14 may read the frame image of a 135 size photographic film, a 110 size photographic film, a photographic film on which a transparent magnetic layer is formed (a 240 size photographic film which is known as an APS film), and 120 size and 220 size (brownie size) photographic films. The line CCD scanner 14 reads, by a line CCD, the frame image which is to be read, and outputs the image data.

In addition to the aforementioned usual types of photographic films, the line CCD scanner 14 can also read images recorded on photographic films which are exclusively used for digital processing and which contain only one of or none of a color correction function and a sharpness enhancing function. (Hereinafter, such films are called "digital films".)

Figure 6:
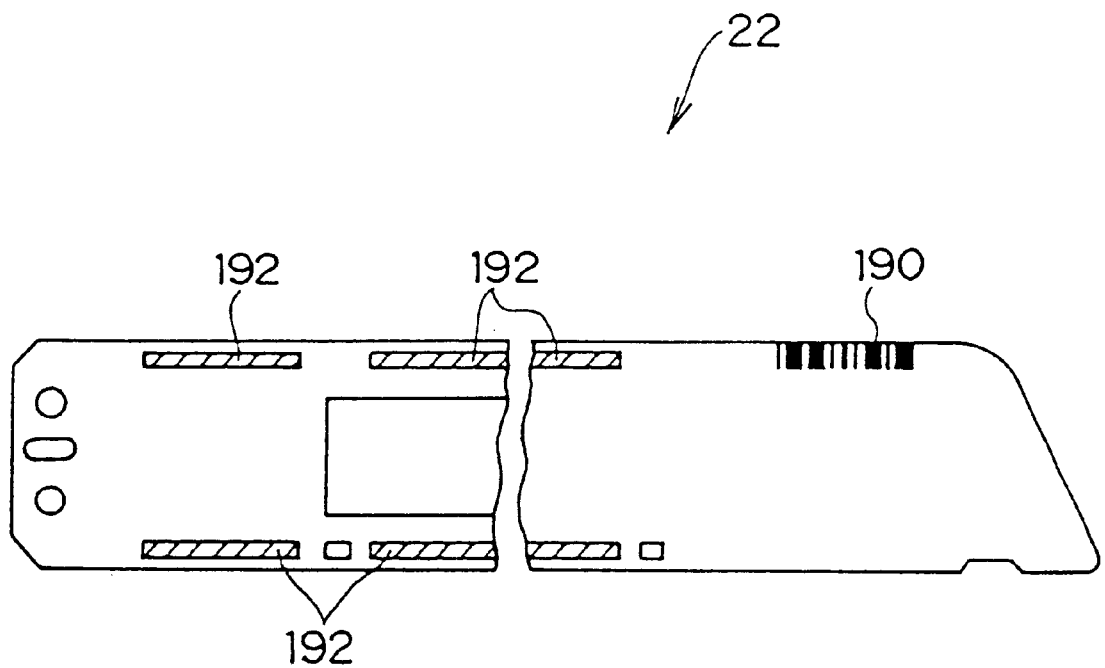
FIG. 6 is a plan view illustrating a photographic film.
Figure 11:
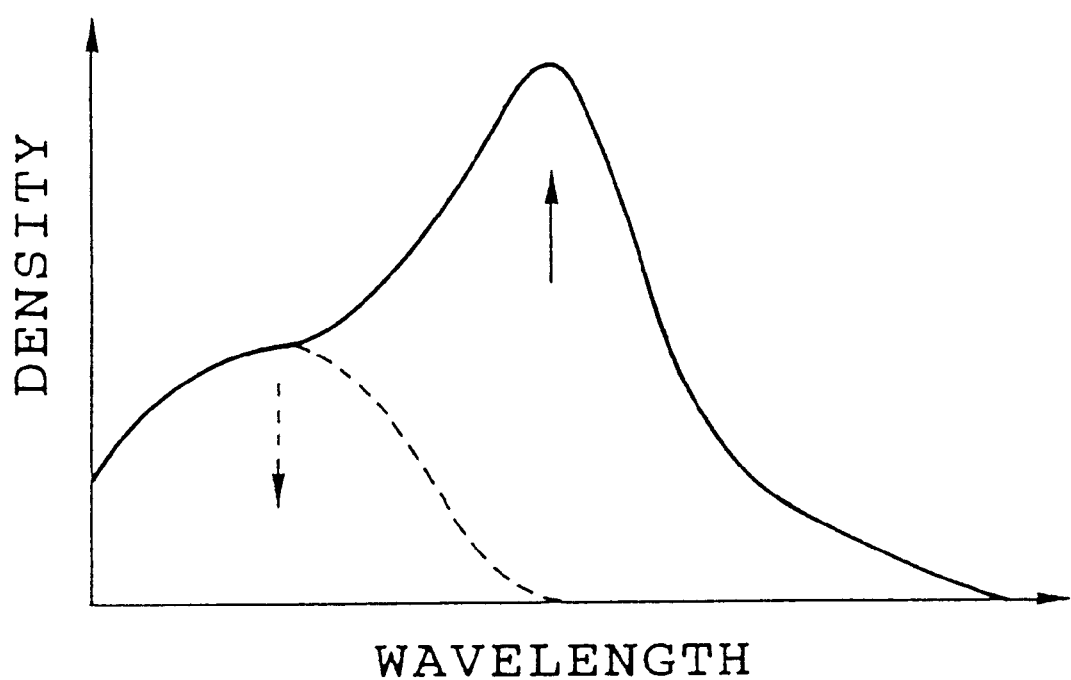
FIG. 11 is a graph for explaining color correction.
Figure 12:
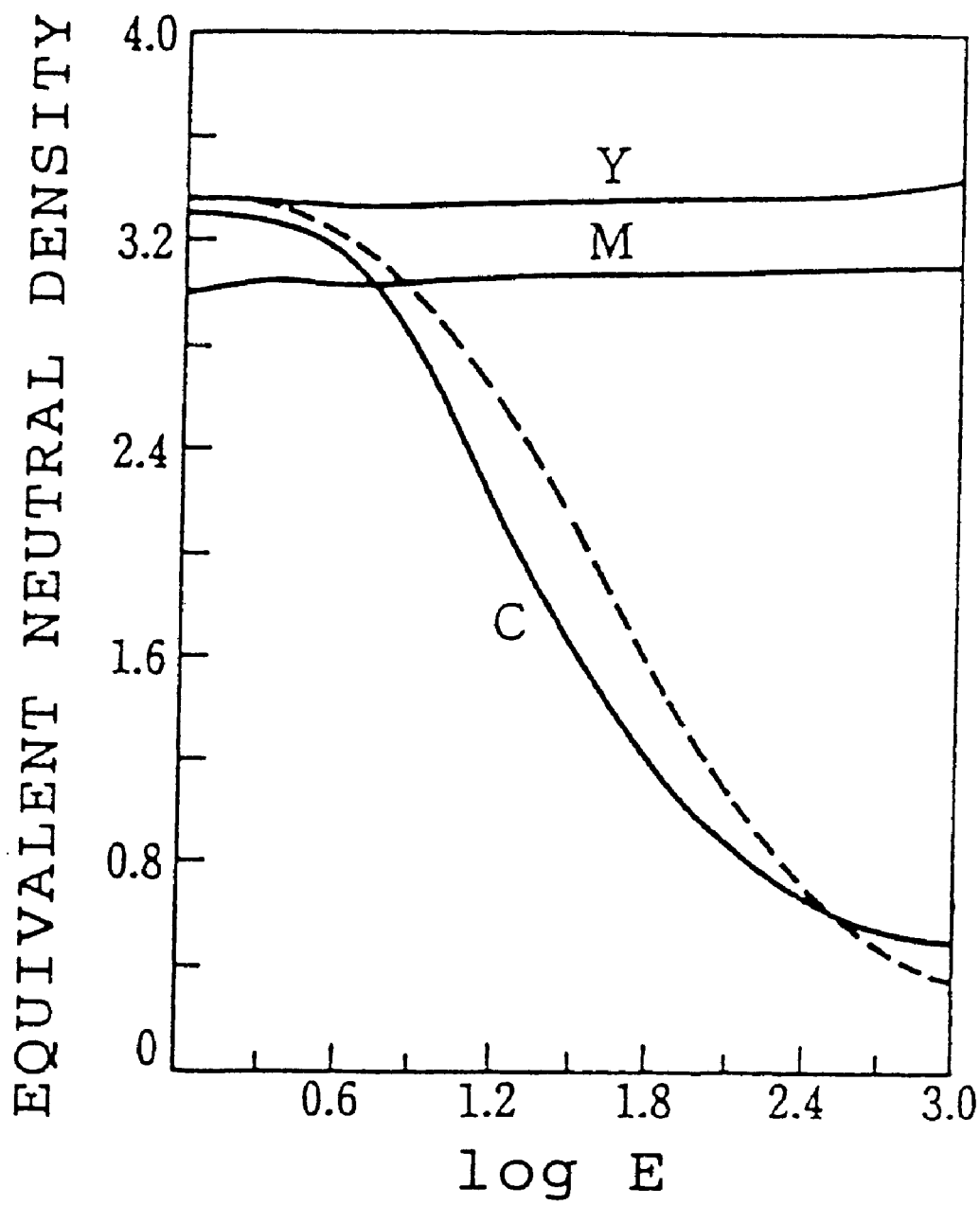
FIG. 12 is a graph illustrating a color characteristic curve of a color reversal film.
Figure 13A:
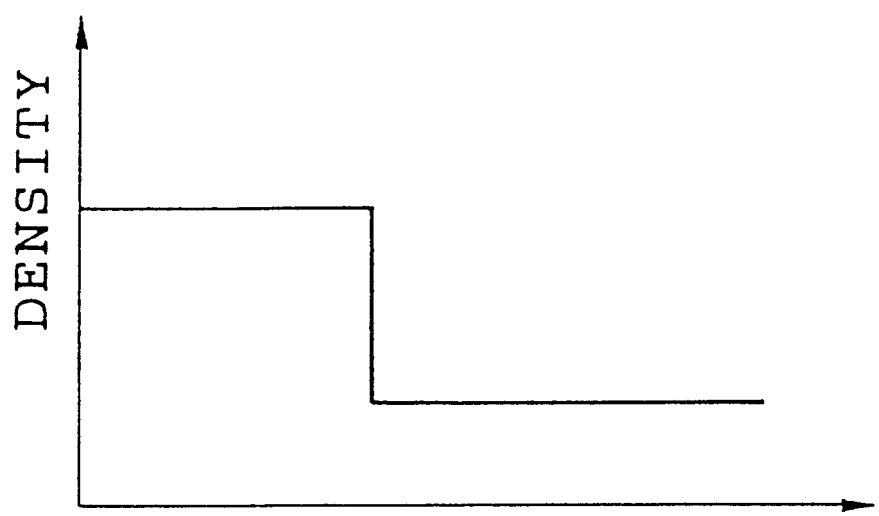
FIGS. 13A and 13B are graphs for explaining sharpness enhancement.
Figure 13B:
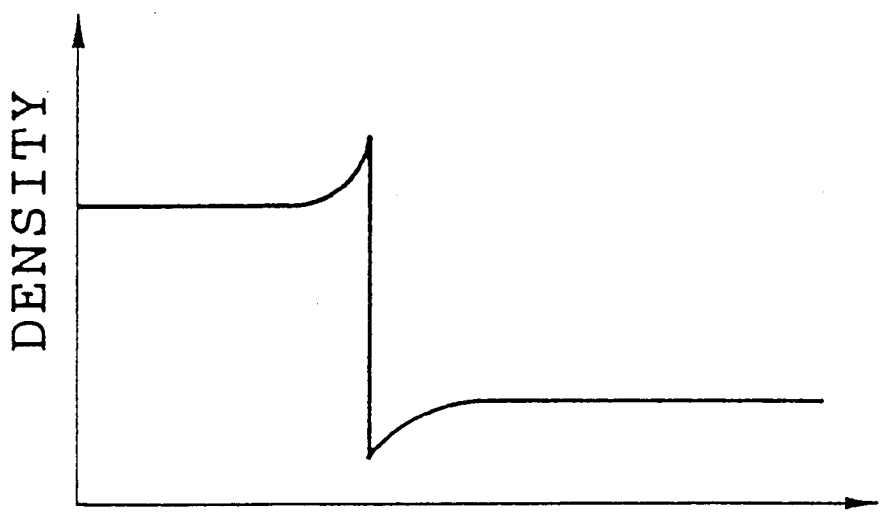

A digital film 22 is illustrated in FIG. 6. As shown in FIG. 6, a magnetic recording layer 192 is provided at the digital film 22. Print conditions and the like are recorded on the magnetic recording layer 192. A bar code 190 is recorded on the digital film 22 in advance (e.g., during manufacturing). The bar code 190 is a digital film identification code which expresses the fact that the film is a digital film. The digital film identification code may be recorded for each frame. The following are examples of identification codes.

Examples of Digital Film Identification Codes

01: digital film 1 (no colored coupler; no color correcting function due to the interimage effect)

02: digital film 2 (no colored coupler; no color correcting function due to the interimage effect and no sharpness enhancing function due to the DIR coupler)

The digital film identification code may be substituted by a DX code. Further, instead of a bar code, information expressing that the film is a digital film may be recorded magnetically on the magnetic recording layer. Or, a storage element may be provided in a cartridge accommodating the digital film 22, and such information may be recorded in the storage element.

Image data (scan image data) outputted from the line CCD scanner 14 is inputted to the image processing section 16. Further, an image file (such as image data obtained by photographing by using a digital camera, image data obtained by reading an original other than a frame image (e.g., by reading a reflection original) by a scanner, or image data generated by a computer), may be inputted to the image processing section 16 from an external source (e.g., may be inputted via a storage medium such as a memory card, may be inputted from another information processing apparatus via a telecommunications line, or the like).

The image processing section 16 carries out image processing, such as various types of correction, on the inputted image data, and outputs the image data subjected to image processing to the laser printer section 18 as image data for recording. Further, the image processing section 16 can output, to an external device and as an image file, image data which has been subjected to image processing. (For example, the image processing section 16 may output the data to a storage medium such as a memory card, or the image processing section 16 may send the data to another information processing apparatus via a telecommunications line, or the like.)

The laser printer section 18 is equipped with R, G and B laser light sources. Laser light, which is modulated in accordance with image data for recording inputted from the image processing section 16, is illuminated onto a photographic printing paper, and an image is recorded onto the photographic printing paper by scan-exposure. Further, the processor section 20 carries out color development processing, bleaching fixing processing, washing processing, and drying processing on the photographic printing paper on which the image was recorded by scan-exposure at the laser printer section 18. In this way, an image is formed on the photographic printing paper.

Structure of the Line CCD Scanner

As illustrated in FIG. 2, the line CCD scanner 14 relating to the present embodiment is provided at a work table 27 at which are also provided the image processing section 16, a mouse 177, two keyboards 166A, 166B, and a display 164.

One of the keyboards 166A is embedded in a work surface 27U of the work table 27. The other keyboard 166B is stored in a drawer 24 of the work table 27 when not being used, and is removed from the drawer 24 and placed on top of the other keyboard 166A when used. At this time, the cord of the keyboard 166B is connected to a jack 110 connected to the image processing section 16.

The cord of the mouse 177 is connected to the image processing section 16 via a hole 108 formed in the work table 27. The mouse 177 is stored in a mouse holder 177A when not in use, and is removed from the mouse holder 177A and placed on the work surface 27U when used.

The image processing section 16 is accommodated in an accommodation portion 16A provided at the work table 27, and is closed therein by a door 25. When the door 25 is opened, the image processing section 16 can be removed from the accommodation portion 16A.

Figure 3:
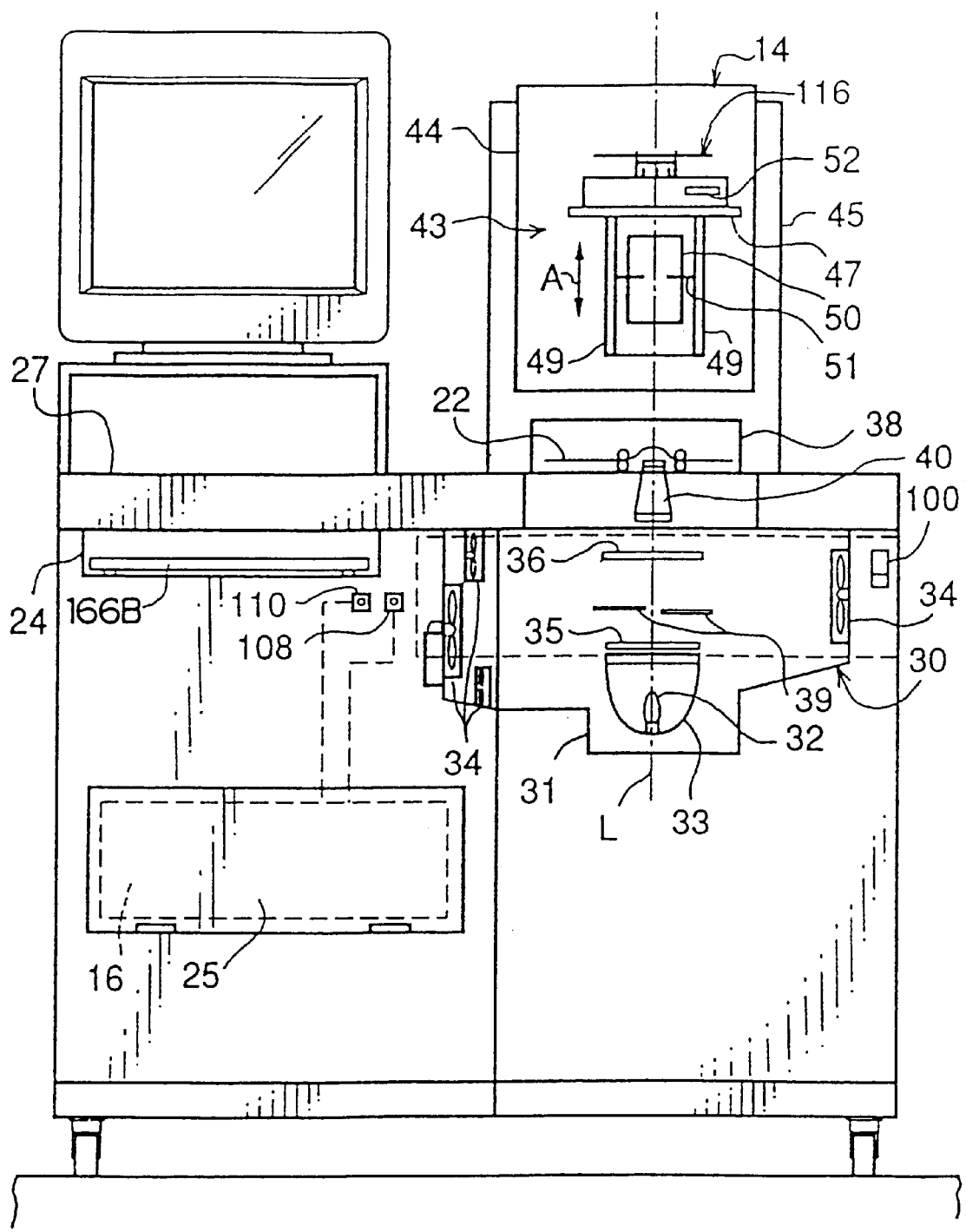
FIG. 3 is a front sectional view of an optical system of the line CCD scanner.

As illustrated in FIG. 3, the optical system of the line CCD scanner 14 is provided with a light source section 30 which is disposed below the work table 27, a diffusion box 40 which is supported at the work table 27, a film carrier 38 which is set at the work table 27, and a reading section 43 which is disposed at the side of the work table 27 opposite the side at which the light source section 30 is disposed.

The light source section 30 is housed in a metal casing 31. A lamp 32, which is a halogen lamp, a metal halide lamp, or the like, is disposed within the casing 31.

A reflector 33 is provided at the periphery of the lamp 32. A portion of the light emitted from the lamp 32 is reflected by the reflector 33, so as to be reflected off in a given direction. Plural fans 34 are provided at the sides of the reflector 33. The fans 34 are operated while the lamp 32 is lit, so as to prevent the interior of the casing 31 from overheating.

A UV/IR cutting filter 35, a diaphragm 39, and a turret 36 are disposed along the optical axis L of the light reflected from the reflector 33 in that order at the side of the reflector 33 from which light is reflected. By cutting light of wavelengths of ultraviolet and infrared regions, the UV/IR cutting filter 35 prevents chemical changing of the photographic film 22 and improves the reading accuracy by preventing an increase in temperature. The diaphragm 39 adjusts the amount of the light from the lamp 32 and the amount of light reflected by the reflector 33. An unillustrated balance filter for negative films and unillustrated balance filter for reversal films are fit into the turret 36. These balance filters appropriately set, in accordance with the type of photographic film (negative film/reversal film), the color components of the light which reaches the digital film 22 and the reading section 43.

The diaphragm 39 is formed from a pair of plate-like members which are disposed so as to sandwich the optical axis L therebetween. The pair of plate-like members are slidable in directions of approaching and moving away from each other. The diaphragm 39 can thus adjust the amount of light passing therethrough to a desired amount.

The diffusion box 40 is formed such that the width thereof along the conveying direction of the photographic film 22 conveyed by the film carrier 28 decreases toward the top portion of the diffusion box 40, i.e., decreases along the direction of approaching the photographic film 22, and such that the width of the diffusion box 40 in the direction orthogonal to the conveying direction of the photographic film 22 (i.e., the length along the transverse direction of the photographic film 22) increases toward the top portion of the diffusion box 40, i.e., increases along the direction of approaching the photographic film 22. Further, light diffusing plates (not shown) are mounted to both the light entering side and the light exiting side of the diffusion box 40. The above-described diffusion box 40 is used for a 135 size photographic film. Other diffusion boxes (not shown) of configurations corresponding to other types of photographic films may also be readied for use.

The light which enters the diffusion box 40 is directed toward the film carrier 38 (i.e., toward the photographic film 22), is made into slit light whose longitudinal direction is the transverse direction of the photographic film 22, is made into diffused light by the light diffusing plates, and exits from the diffusion box 40. In this way, by making the light which exits from the diffusion box 40 diffused light, there is less unevenness of the amount of light illuminated onto the photographic film 22, slit light of a uniform amount of light is illuminated onto the film image, and even if the film image is scratched, the scratches are difficult to notice.

A film carrier 38 and diffusion box 40 are readied for each type of photographic film 22, and are selected in accordance with the type of photographic film 22.

A long, thin hole (not shown), whose length along the transverse direction of the photographic film 22 is wider than the width of the photographic film 22, is provided in each of the top surface and the bottom surface of the film carrier 38 at positions intersecting the optical axis L. The slit light from the diffusion box 40 is illuminated onto the photographic film 22 via the hole in the bottom surface of the film carrier 38. The light which has passed through the photographic film 22 passes through the hole in the top surface of the film carrier 38 and reaches the reading section 43.

A guide (not shown) which guides the photographic film 22 is provided at the film carrier 38 so as to bend the photographic film 22 at the position at which the slit light is illuminated from the diffusion box 40 (i.e., at the reading position). In this way, the planarity of the surface of the photographic film 22 at the reading position can be ensured.

The diffusion box 40 is supported such that the top surface thereof is near the reading position. Thus, a cut-out portion is provided in the bottom surface of the film carrier 38 so that the film carrier 38 and the diffusion box 40 do not interfere with each other when the film carrier 38 is loaded.

The film carrier 38 is formed so as to be able to convey the photographic film 22, when prescanning or fine scanning is carried out, at various different speeds in accordance with the density of the film image being fine scanned.

The reading section 43 is accommodated within a casing 44. A loading stand 47, on whose top surface a line CCD 116 is mounted, is provided within the casing 44. A lens cylinder 49 hangs downward from the loading stand 47. A lens unit 50 is supported within the lens cylinder 49. The lens unit 50 is slidable in the directions of arrow A so as to approach and move away from the work table 27 in order to adjust the magnification (e.g., reduction, enlargement). A support frame 45 is provided at the work table 27. The loading stand 47 is supported by guide rails (unillustrated) which are mounted to the support frame 45, such that the loading stand 47 is slidable in directions of approaching and moving away from the work table 27 in order to ensure the conjugate length when the magnification is changed or during autofocusing. The lens unit 50 is formed from plural lenses, and a lens diaphragm 51 is provided between the plural lenses. The lens diaphragm 51 is provided with plural diaphragm plates (not shown) which are formed in a substantially C-shaped configuration. Each diaphragm plate is rotated in the same direction when driving force from a lens diaphragm driving motor (which will be explained later) is transmitted thereto. As the diaphragm plates rotate, the surface area of the portion which is not cut off from light by the diaphragm plates is changed around the optical axis L such that the amount of light which passes through the lens diaphragm 51 changes.

In the line CCD 116, a plurality of photoelectric converting elements such as CCD cells or photodiodes are provided in a line along the transverse direction of the photographic film 22, and sensing portions provided with electronic shutter mechanisms are provided in three parallel lines spaced apart from one another. A color separating filter of R, G or B is mounted to the light-incident side of each sensing portion. (Namely, the line CCD 116 is a so-called 3-line color CCD.) Further, plural transmitting portions are provided in vicinities of each of the sensing portions so as to correspond to the sensing portions. The charge accumulated in each CCD cell of the sensing portions is transmitted in order via the corresponding transmitting portion.

A CCD shutter 52 is provided at the light-incident side of the line CCD 116. An ND filter (not shown) is fit into the CCD shutter 52. The CCD shutter 52 rotates in a predetermined direction to switch to one of a completely closed state, which is for dark correction and in which the CCD shutter 52 blocks light which would otherwise be incident on the line CCD 116, a completely open state, which is for regular reading or for light correction and in which the CCD shutter 52 allows light to be incident onto the line CCD 116, and a light-reducing state, which is for linearity correction and in which the light to be incident on the line CCD 116 is reduced by the ND filter.

A compressor 94, which generates cooling air to cool the photographic film 22, and a flow rate sensor 96, which detects the flow rate of the cooling air, are provided at the work table 27. Neither the compressor 94 nor the flow sensor 96 is illustrated in FIG. 3.

Figure 4:
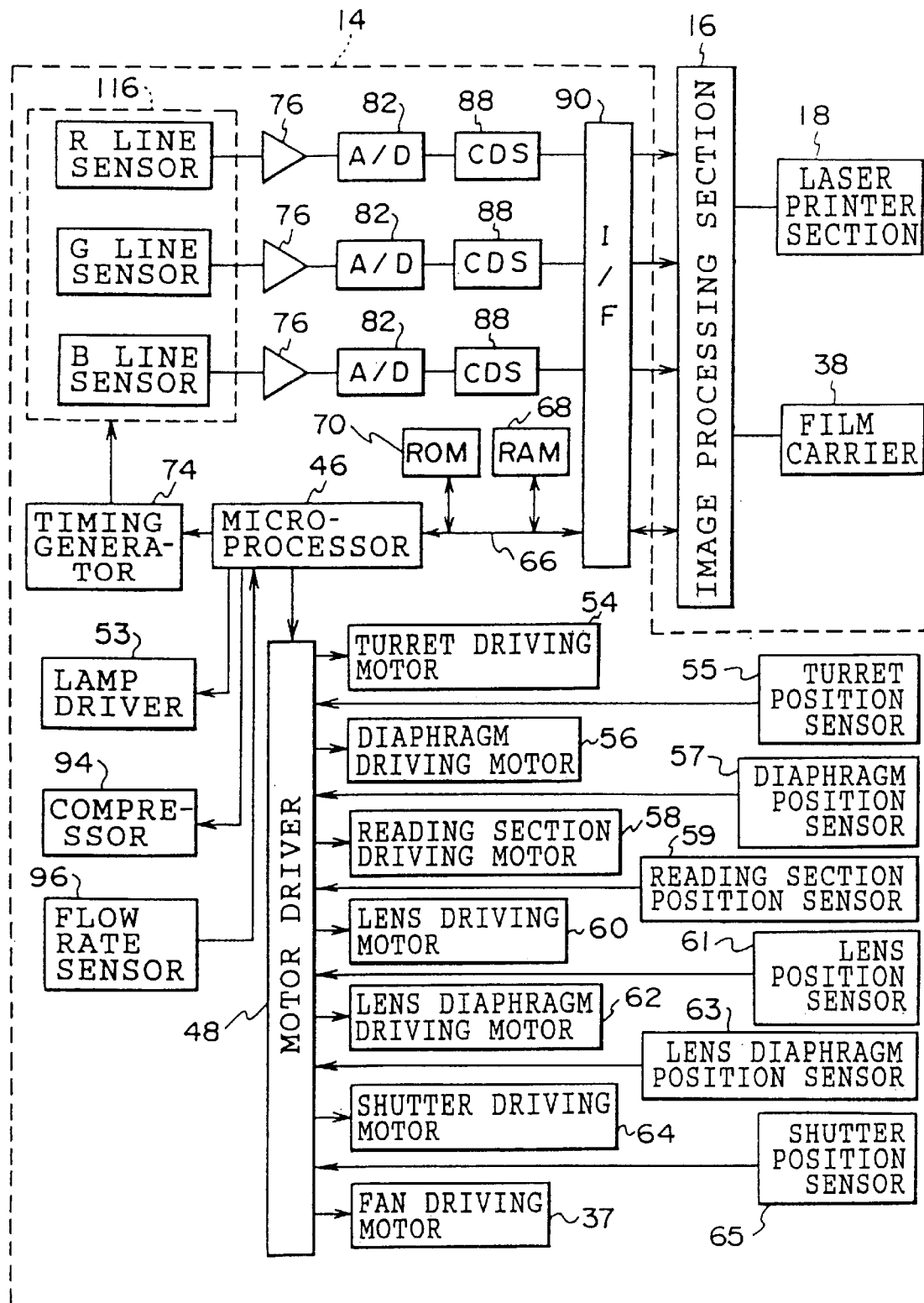
FIG. 4 is a block diagram illustrating a schematic structure of an electrical system of a line CCD scanner.

Next, the basic structure of the electric system of the line CCD scanner 14 will be described with reference to FIG. 4.

The line CCD scanner 14 has a microprocessor 46 which governs the overall control of the line CCD scanner 14. A RAM 68 (e.g., an SRAM) and a ROM 70 (e.g., a ROM whose stored contents are rewritable) are connected to the microprocessor 46 via a bus 66. A lamp driver 53, the compressor 94, the flow rate sensor 96, and a motor driver 48 are connected to the microprocessor 46. The lamp driver 53 turns the lamp 32 on and off in accordance with instructions from the microprocessor 46. When the film image of the photographic film 22 is being read, the microprocessor 46 operates the compressor 94 to supply cooling air to the photographic film 22. The flow rate of the cooling air is detected by the flow rate sensor 96, and the microprocessor 46 senses abnormalities.

A turret driving motor 54 and a turret position sensor 55 are connected to the motor driver 48. The turret driving motor 54 drives the turret 36 to rotate in a predetermined direction such that one of the balance filter for negative films or the balance filter for reversal films of the turret 36 is positioned on the optical axis L. The turret position sensor 55 detects a reference position of the turret 36. Also connected to the motor driver 48 are a diaphragm driving motor 56 for sliding the diaphragm 39, a diaphragm position sensor 57 which detects the position of the diaphragm 39, a reading section driving motor 58 which slides the loading stand 47 (i.e., the line CCD 116 and the lens unit 50), a reading section position sensor 59 for detecting the position of the loading stand 47, a lens driving motor 60 which slides the lens unit 50 along the lens cylinder 49, a lens position sensor 61 for detecting the position of the lens unit 50, a lens diaphragm driving motor 62 for rotating the diaphragm plates of the lens diaphragm 51, a lens diaphragm position sensor 63 for detecting the position of the lens diaphragm 51, a shutter driving motor 64 for switching the CCD shutter 52 between the completely closed state, the completely open state, and the light reducing state, a shutter position sensor 65 for detecting the position of the shutter, and a fan driving motor 37 for driving the fan 34.

When prescanning (preliminary reading) and fine scanning (main reading) are carried out by the line CCD 116, on the basis of the positions of the turret 36 and the diaphragm 39 detected by the turret position sensor 55 and the diaphragm position sensor 57, the microprocessor 46 rotates the turret 36 by the turret driving motor 54 and slides the diaphragm 39 by the diaphragm driving motor 56 so as to adjust the light illuminated onto the film image.

The microprocessor 46 determines the zoom magnification in accordance with the size of the film image, whether trimming is to be carried out, and the like. The microprocessor 46 slides the loading stand 47 by the reading section driving motor 58 on the basis of the position of the loading stand 47 detected by the reading section position sensor 59, so that the film image is read by the line CCD 116 at the determined zoom magnification. Further, the microprocessor 46 slides the lens unit 50 by the lens driving motor 60 on the basis of the position of the lens unit 50 detected by the lens position sensor 61.

When focussing control to make the light-receiving surface of the line CCD 116 coincide with the film image image-forming position by the lens unit 50 is carried out (i.e., when autofocusing control is carried out), the microprocessor 46 slides only the loading stand 47 by the reading section driving motor 58. This focussing control can be carried out by, for example, making the contrast of the film image read by the line CCD 116 a maximum (what is known as the image contrast method). Alternatively, a distance sensor which measures by infrared rays or the like the distance between the photographic film 22 and the lens unit 50 (or the line CCD 116) may be provided, and focussing control can be carried out on the basis of the distance detected by the distance sensor instead of on the basis of the data of the film image.

A timing generator 74 is connected to the line CCD 116. The timing generator 74 generates various types of timing signals (clock signals) for operating the line CCD 116, an A/D converter 82 which will be described later, and the like. The signal output terminal of the line CCD 116 is connected to the A/D converter 82 by an amplifier 76. The signal outputted from the line CCD 116 is amplified by the amplifier 76 and is converted into digital data at the A/D converter 82.

The output terminal of the A/D converter 82 is connected to the image processing section 16 via a correlation double sampling circuit (CDS) 88 and an interface (I/F) circuit 90 in that order. At the CDS 88, feedthrough data which expresses the level of a feedthrough signal and pixel data expressing the level of a pixel signal are respectively sampled, and the feedthrough data is subtracted from the pixel data for each pixel. The CDS 88 successively outputs the results of calculation (pixel data which accurately corresponds to the amount of accumulated charge in each CCD cell) to the image processing section 16 via the I/F circuit 90 as scan image data.

Because the R, G, B photometric signals are outputted in parallel from the line CCD 116, three signal processing systems, each having an amplifier 76, an A/D converter 82 and a CDS 88, are provided. The R, G, B image data which is the scan image data are inputted in parallel from the I/F circuit 90 to the image processing section 16.

Structure of Image Processing Section 16

Figure 5:
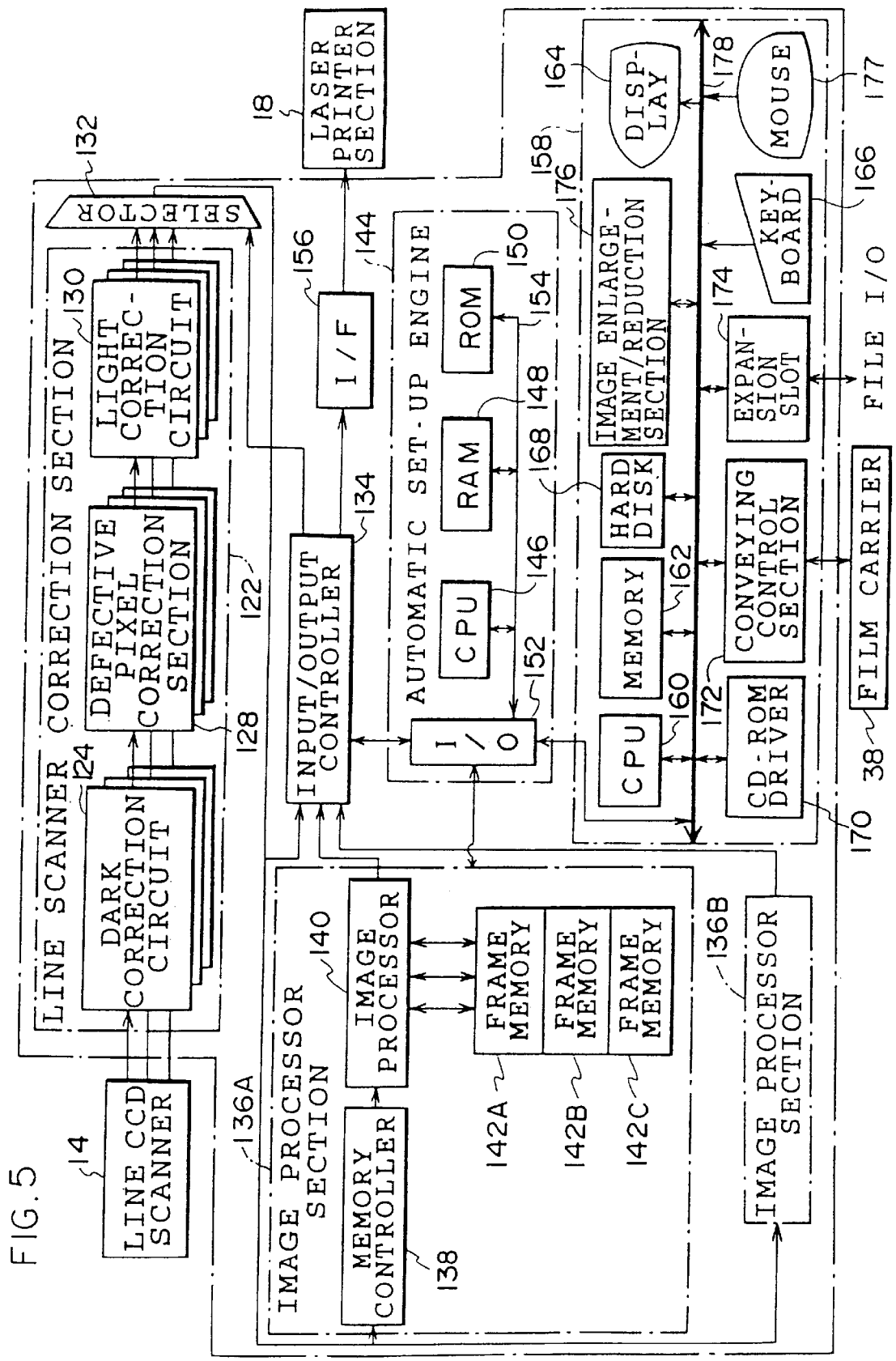
FIG. 5 is a control block diagram of an image processing section.

Next, the structure of the image processing section 16 will be described with reference to FIG. 5. At the image processing section 16, a line scanner correction section 122 is provided so as to correspond to the line CCD scanner 14. The line scanner correction section 122 is provided with three signal processing systems which respectively correspond to the R, G, B image data outputted in parallel from the line CCD scanner 114. Each signal processing system is formed from a dark correction circuit 124, a defective pixel correction section 128, and a light correction circuit 130.

In the state in which the light-incident side of the line CCD 116 is blocked by the shutter, the dark correction circuit 124 stores, for each cell, data inputted from the line CCD scanner 14 (data expressing the dark output level of each cell of the sensing portions of the line CCD 116). The dark correction circuit 124 corrects the scan image data by subtracting, from the scan image data inputted from the line CCD scanner 14, the dark output levels of the cells corresponding to the respective pixels.

The photoelectric conversion characteristic of the line CCD 116 varies from cell to cell. At the light correction circuit 130 which comes after the defective pixel correction section 128, a gain is determined for each cell on the basis of image data of a frame image for adjustment, whose entire image surface has a constant density, which image data is inputted from the line CCD scanner 14 by reading the frame image for adjustment at the line CCD 116 when the frame image for adjustment is set at the line CCD scanner 14. (The variations in the densities -of the respective pixels represented by the image data of the frame image for adjustment are the cause of the variations in the photoelectric conversion characteristics of the respective cells.) The image data of the frame image which is to be read, which image data is inputted from the line CCD scanner 14, is corrected per pixel in accordance with the determined gain for each cell.

In the image data obtained from the frame image for adjustment, if the density of a given pixel differs greatly from the densities of the other pixels, there is some sort of abnormality in the cell of the line CCD corresponding to that given pixel, and it can be judged that given pixel is a defective pixel. The defective pixel correction section 128 stores the address of the defective pixel on the basis of the image data of the frame image for adjustment. The defective pixel correction section 128 interpolates data for the defective pixel from the data of the pixels surrounding the defective pixel and generates new data for the defective pixel.

The line CCD is structured such that the three lines (CCD cell arrays) are disposed in order along the conveying direction of the photographic film so as to be spaced apart from one another by predetermined intervals. Therefore, the outputting of the image data of the R, G, B component colors from the line CCD scanner 14 begins at different times. The line scanner correction section 122 delays outputting the image data by delay times which differ for each of the component colors, so that the R, G, B image data of a single pixel on the frame image are output simultaneously.

The output terminal of the line scanner correction section 122 is connected to the input terminal of a selector 132, such that image data outputted from the correction section 122 is inputted to the selector 132. Further, the input terminal of the selector 132 is connected to the data output terminal of an input/output controller 134. File image data outputted from an external source is inputted to the selector 132 from the input/output controller 134. The output terminal of the selector 132 is connected to the respective data input terminals of the input/output controller 134 and image processor sections 136A, 136B. The selector 132 can selectively output image data inputted thereto to the input/output controller 134 and the image processor sections 136A, 136B.

The image processor section 136A is provided with a memory controller 138, an image processor 140, and three frame memories 142A, 142B, 142C. Each of the frame memories 142A, 142B, 142C has the capacity to store the image data of one frame image. The image data inputted from the selector 132 is stored in one of these three frame memories 142. The memory controller 138 controls the address at the time of storing the image data in the frame memory 142 such that the data of the respective pixels of the inputted image data are stored so as to be arranged in a fixed order in the storage regions of the frame memories 142A, 142B, 142C.

The image processor 140 fetches the image data stored in the frame memories 142A, 142B, 142C, and carries out various image processings thereon such as gradation conversion, color conversion, hypertone processing for compressing the gradation of ultra-low frequency brightness components of the image, hypersharpness processing for enhancing sharpness while suppressing graininess, and the like. The processing conditions for the image processing are automatically calculated by an automatic set-up engine 144 (which will be described later), and the image processing is carried out in accordance with the calculated processing conditions. The image processor 140 is connected to the input/output controller 134. The image data which has been subjected to image processing is temporarily stored in one of the frame memories 142A, 142B, 142C, and thereafter, is inputted to the input/output controller 134 at a predetermined timing. Since the image processor section 136B has the same structure as that of the image processor section 136A, description thereof will be omitted.

In the present embodiment, reading of each frame image is carried out twice at the line CCD scanner 14, each time at a different resolution. In the first reading (hereinafter, "prescan") which is carried out at a relatively low resolution, even in cases in which the density of the frame image is extremely low (e.g., an overexposed negative image on a negative film), the frame image is read at reading conditions (the light amount for each of the wavelength regions R, G, B of the light illuminated onto the photographic film and the charge accumulating time of the CCD) which are determined such that the accumulated charge at the line CCD 116 does not become saturated. The image data obtained by this prescanning (prescan image data) is inputted to the input/output controller 134 from the selector 132, and is outputted to the automatic set-up engine 144 connected to the input/output controller 134.

The automatic set-up engine 144 includes a CPU 146, a RAM 148 (e.g., a DRAM), a ROM 150 (e.g., a ROM whose stored contents are rewritable), and an input/output port 152. These elements are connected together via a bus 154.

On the basis of prescan image data of a plurality of frame images inputted from the input/output controller 134, the automatic set-up engine 144 calculates the processing conditions of the image processing which is to be carried out on the image data (fine scan image data) obtained by the second reading by the line CCD scanner 14 which second reading is carried out at a relatively high resolution. (Hereinafter, this second reading which is carried out at a relatively high resolution is called the fine scan.) The automatic set-up engine 144 outputs the calculated processing conditions to the image processor 140 of the image processor section 136A or 136B. In the calculation of the image processing conditions, it is judged, from the amount of exposure light at the time of photographing or the type of light source used during photographing or some other characteristic amount, whether there are plural image frames in which a similar scene has been photographed. If there are plural image frames in which a similar scene has been photographed, the processing conditions of the image processing on the fine scan image data of these image frames are determined such that they are the same or similar.

The appropriate processing conditions for image processing change in accordance with whether the image-processed image data is to be used in recording an image onto a photographic printing paper at the laser printer section 18, whether the image-processed image data is to be outputted to the exterior, or the like. Because the image processing section 16 is provided with two image processor sections 136A, 136B, in the case in which, for example, the image data is to be used to record an image onto a photographic printing paper and is to be outputted to the exterior, the automatic set-up engine 144 calculates respective appropriate processing conditions for each use, and outputs these processing conditions to the image processor sections 136A, 136B. In this way, at the image processing sections 136A, 136B, image processing under different processing conditions can be carried out on the same fine scan image data.

On the basis of the prescan image data of the frame image inputted from the input/output controller 134, the automatic set-up engine 144 calculates parameters for image recording which define the gray balance and the like for the time of recording an image onto a photographic printing paper at the laser printer section 18, and the automatic set-up engine 144 outputs the parameters to the laser printer section 18 simultaneously with the outputting of image data for recording which will be described later. Further, the automatic set-up engine 144 also calculates, in the same way as described above, processing conditions for image processing of file image data which is inputted from an external source.

The input/output controller 134 is connected to the laser printer section 18 via an I/F circuit 156. When image data which has been subjected to image processing is to be used to record the image onto a photographic printing paper, the image data which was subjected to image processing in the image processor section 136A or 136B is output as image data for recording from the input/output controller 134 via the I/F circuit 156 to the laser printer section 18. Further, the automatic set-up engine 144 is connected to a personal computer 158. When the image data which has been subjected to image processing is to be outputted to the exterior as an image file, the image data which was subjected to image processing in the image processor section 136 is outputted from the input/output controller 134 via the automatic set-up engine 144 to the personal computer 158.

The personal computer 158 has a CPU 160, a memory 162, the display 164, the keyboard 166 (see FIG. 2), the mouse 177, a hard disk 168, a CD-ROM driver 170, a conveying control section 172, an expansion slot 174, and an image compression/expansion section 176. These elements are connected together via a bus 178.

The conveying control section 172 is connected to the film carrier 38 and controls the conveying of the photographic film 22 by the film carrier 38. Further, the film carrier 38 has a bar code sensor (not illustrated) for reading the bar code 190 and a magnetic head (not illustrated) for reading information recorded on the magnetic recording layer 192. In this way, the digital film identification code recorded in the bar code 190 and the information recorded on the magnetic recording layer 192 can be read.

Parameters for carrying out prescanning in accordance with the digital film identification code and parameters for carrying out color correction or sharpness processing are stored in advance in the hard disk 168 as will be described in detail later.

A driver (not shown), which carries out reading and writing of data from and onto a recording medium such as a memory card, or a communications control device, which carries out communication with other information processing devices, or the like are connected to the personal computer 158 via the expansion slot 174. When image data for output to the exterior is inputted to the personal computer 158 from the input/output controller 134, the image data is outputted as an image file to the exterior (a driver, a communications control device, or the like) via the expansion slot 174.

When file image data is inputted to the personal computer 158 from the exterior via the expansion slot 174, the inputted file image data is outputted to the input/output controller 134 via the automatic set-up engine 144. In this case, the file image data inputted at the input/output controller 134 is outputted to the selector 132.

The image processing section 16 may output the prescan image data and the like to the personal computer 158. The frame image read at the line CCD scanner 14 is displayed on the display 164, or the image which will be obtained by recording onto a photographic printing paper may be estimated and displayed on the display 164. When correction or the like of the image is designated by the operator via the keyboard 166, that designation can be reflected in the processing conditions of the image processing.

Hereinafter, a control routine relating to the reading and image processing of a frame image, which is executed by the personal computer 158 and the CPU 160, will be described as the operation of the present embodiment in accordance with the flowchart of FIG. 7.

When the operator inserts a digital film 22 into an insertion opening (not shown) of the film carrier 38 and gives instructions to start a predetermined processing, the control routine of FIG. 7 begins by the CPU 160.

First, in step 202, the barcode 190 of the digital film 22 is read by the bar code sensor (not shown). In subsequent step 204, prescanning conditions corresponding to the identification code are computed. The prescanning conditions are computed on the basis of film base densities which correspond to the identification codes as follows.

Examples of Film Base Densities per Identification Code none (regular film): R=0.2, G=0.6, B=0.8
01 (digital film 1): R=0.05, G=0.05, B=0.05
02 (digital film 2): R=0.05, G=0.05, B=0.05

In this way, because the digital film does not include a colored coupler, the base densities are low (0.05), and if prescanning is carried out under the conditions for an ordinary negative film, there is saturation of the accumulated charge in the line CCD 116. Therefore, the diaphragm 39 of the line CCD scanner 14 is adjusted such that prescanning is carried out with the light amounts of the respective R, G, B wavelength regions of the light illuminated onto the film being lower than those in the case of an ordinary negative film (step 206). Thus, the accumulated charge in the line CCD 116 does not become saturated.

Next, fine scan conditions are computed (step 208) on the basis of the prescan image data obtained during prescanning, and the film is fine scanned under the fine scan conditions (step 210).

Then, the parameters for color correction which correspond to the read identification code are read from the hard disk 168 (step 212), and parameters for sharpness processing which correspond to the read identification code are read from the hard disk 168 (step 214). Examples of the parameters for color correction are the following 3×3 matrices.

For No Identification Code:

$$\begin{pmatrix} R' \\ G' \\ B' \end{pmatrix} = \begin{pmatrix} 1.0 & 0 & 0 \\ 0 & 1.0 & 0 \\ 0 & 0 & 1.0 \end{pmatrix} \begin{pmatrix} R \\ G \\ B \end{pmatrix}$$

For Identification Code 01:

$$\begin{pmatrix} R' \\ G' \\ B' \end{pmatrix} = \begin{pmatrix} 1.0 & 0 & 0 \\ -0.2 & 1.2 & 0 \\ -0.2 & -0.2 & 1.4 \end{pmatrix} \begin{pmatrix} R \\ G \\ B \end{pmatrix}$$

For Identification Code 02:

$$\begin{pmatrix} R' \\ G' \\ B' \end{pmatrix} = \begin{pmatrix} 1.0 & 0 & 0 \\ -0.3 & 1.3 & 0 \\ -0.3 & -0.3 & 1.6 \end{pmatrix} \begin{pmatrix} R \\ G \\ B \end{pmatrix}$$

Color correction can be effected by carrying out calculation with these 3×3 matrices.

Sharpness processing can be carried out on the basis of the following formula in which the data of the respective color components of the fine scan image are $f_i$ (i=R, G, B):

$$f_i' = f_i + K \times (f_i - LPF(f_i))$$

wherein K is a parameter expressing the degree of enhancement. K is expressed by $K = K_O \times K_{film}$ wherein $K_O$ is the value of the default degree of enhancement, and $K_{film}$ is a parameter which differs in accordance with the type of the film. For example, $K_{film}$ is 1.0 for an ordinary negative film and for digital film 1 (identification code: 01), and $K_{film}$ is 1.3 for digital film 2 (identification code: 02). Namely, because the digital film 2 does not have a sharpness enhancement function which results from a DIR coupler, the degree of enhancement is set to be higher than that of an ordinary negative film and the digital film 1 which do include a DIR coupler.

$LPF(f_i)$ is a function expressing the filtering of a low pass filter, and is for removing low-frequency components. Namely, sharpness can be enhanced by enhancing a signal from which the low frequency components have been removed and adding this enhanced signal to the original signal.

In step 216, the parameters for carrying out color correction and sharpness correction are output to the automatic set-up engine 144. At the automatic set-up engine 144, as illustrated in FIG. 8, in step 302, the inputted color correction parameters and sharpness processing parameters and, if necessary, parameters of other processings are combined, and the image processing conditions are computed. Then, in step 304, the computed image processing conditions are outputted to the image processor section 136A.

At the image processor section 136A, as shown in FIG. 9, color correction processing (step 402), sharpness processing (step 404), and other image processings if necessary are carried out on the basis of the designated image processing conditions. Then, the image data which has been subjected to image processing is outputted to the laser printer section 18 (step 406).

At the laser printer section 18, laser light, which has been modulated in accordance with the image data for recording which was inputted from the image processing section 16, is illuminated onto the photographic printing paper, and an image is recorded onto the photographic printing paper by the scan-exposure. Then, at the processor section 20, the photographic printing paper on which the image was recorded by the scan-exposure at the laser printer section 18 is subjected to color developing processing, bleaching fixing processing, rinsing processing and drying processing. The image is thereby formed on the photographic printing paper.

In this way, even in cases of processing a digital film which does not have a color correction function or a sharpness enhancing function, processing can be carried out with the prescan conditions, color correction processing conditions, and sharpness processing conditions being changed automatically in accordance with the identification code recorded on the film. Thus, the image quality does not deteriorate by such a film being mistakenly processed under the processing conditions of an ordinary negative film.

In an analog printing system in which digital image processing cannot be carried out, as illustrated in FIG. 10, first, a determination is made in step 502 as to whether an identification code can be acquired. If an identification code can be acquired, it is determined that a digital film is set, and in step 504, an alarm is sounded or a warning message is displayed, and processing ends. If no identification code can be acquired, it is judged that an ordinary negative film is set, and in step 506, ordinary printing processing is carried out. Therefore, even in a case in which a digital film is set in an analog printing system, the image quality does not deteriorate due to printing processing being mistakenly carried out. Further, in a case in which a digital film is set, it is possible to effect control such that no warning is sounded or displayed, but it is made impossible to effect printing processing.

In this way, by adding an identification code to a digital film, even in cases in which digital films and ordinary negative films become mixed together at a place of sale, they can be processed without confusion.

In the present embodiment, in a case in which the digital film is prescanned, the diaphragm 39 is adjusted such that the amount of light illuminated onto the film is reduced. However, the present invention is not limited to the same, and it is possible to shorten the charge accumulation time of the line CCD 116, or to reduce the amount of light and shorten the charge accumulation time.

Further, in the present embodiment, parameters for carrying out prescanning in accordance with the digital film identification code or parameters for carrying out color correction or sharpness processing in accordance with the digital film identification code are stored in advance in the hard disk 168. However, the present invention is not limited to the same, and such parameters may be directly recorded onto a storage element provided at a cartridge which accommodates the digital film 22.

In the above-described embodiment, a colored coupler is used as an example of the color correction function and a DIR coupler is used as an example of the sharpness enhancing function. However, the present invention is not limited to the same, and other means may be used. Further, the present invention is applicable not only to silver halide photographic photosensitive materials which do not have a color correction function and/or a sharpness enhancing function, but is also applicable to silver halide photographic photosensitive materials which have a weak color correction function and/or a weak sharpness enhancing function. In this way, color reproduction is better than a case in which correction is carried out during image processing, and a high-quality image having enhanced sharpness can be generated.

As described above, in accordance with the present invention, an identification code is recorded on a photographic film which either has only one of or none of (A) a colored coupler or interimage effect for carrying out color correction and (B) a DIR coupler for carrying out sharpness processing. In accordance with the identification code, color correction and sharpness processing are carried out in the image processing. Therefore, the photographic photosensitive material can be made inexpensive, and processing can be carried out with conventional photographic films being reliably distinguished from one another.

What is claimed is:

1. A photographic printing system for carrying out printing on the basis of an image recorded on a first photographic photosensitive material other than a second photographic photosensitive material which either has only one of or none of a color correcting code for carrying out color correction of an image which has been subjected to developing processing and a sharpness enhancing code for enhancing sharpness of the image which has been subjected to developing processing, wherein an identification code is recorded on said first photographic photosensitive material, said identification code expressing that said photographic photosensitive material either has only one of or none of said color correcting code and said sharpness enhancing code, said photographic printing system comprising:

an input means for receiving said first photographic material with said identification code; and identification code reading means for reading said identification code recorded on said first photographic photosensitive material.

2. A photographic printing system according to claim 1, further comprising:

notifying means for, in a case in which said identification code is read by said identification code reading means, carrying out notification.

3. A photographic printing system according to claim 1, further comprising:

processing means for, in a case in which said identification code is read by said identification code reading means, carrying out a processing for making printing impossible.

4. A photographic printing system able to carry out printing on the basis of an image recorded on a photographic photosensitive material which either has only one of or none of a color correcting code for carrying out color correction of an image which has been subjected to developing processing and a sharpness enhancing code for enhancing sharpness of the image which has been subjected to developing processing, wherein an identification code is recorded on said photographic photosensitive material, said identification code expressing that said photographic photosensitive material either has only one of or none of said color correcting code and said sharpness enhancing code, comprising:

identification code reading means for reading said identification code recorded on said photographic photosensitive material;

a light source for illuminating light onto said photographic photosensitive material;

image forming means for forming an image of light which has been emitted from said light source and has passed through said photographic photosensitive material;

image reading means for, on the basis of image reading conditions corresponding to the read identification code, reading the image formed by said image forming means;

color correcting means for, on the basis of color correcting conditions corresponding to the read identification code, carrying out color correction on the image read by said image reading means; and sharpness enhancing means for, on the basis of sharpness processing conditions corresponding to the read identification code, carrying out sharpness enhancement on the image read by said image reading means.

5. A photographic printing system according to claim 4, wherein said image reading conditions corresponds to at least one of (A) the amount of light emitted from said source and illuminated onto said photographic photosensitive material, and (B) the charge accumulating time of said image reading means less than that of a photographic photosensitive material which includes both a colored coupler and a DIR coupler.

\* \* \* \* \*